No. 654,954. Patented July 31, 1900.
G. W. DECKER.
CAR LOADING APPARATUS.
(Application filed Apr. 21, 1899.)
(No Model.) 6 Sheets—Sheet 1.

Attest:
Melville C. Hawley
G. A. Tauberschmidt

Inventor:
George W. Decker
by Benj. T. ...
Attorney

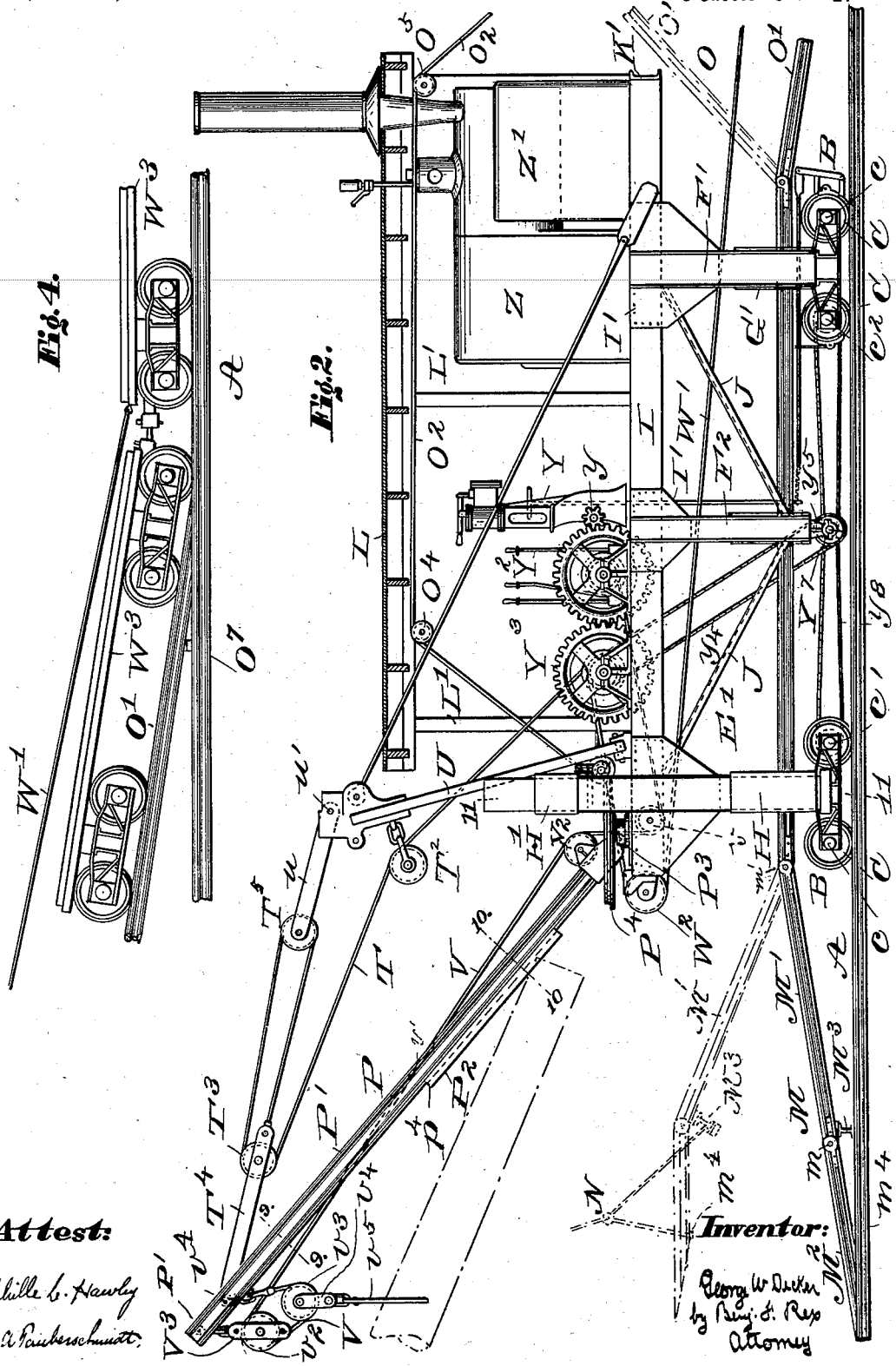

No. 654,954. Patented July 31, 1900.
G. W. DECKER.
CAR LOADING APPARATUS.
(Application filed Apr. 21, 1899.)
(No Model.) 6 Sheets—Sheet 3.
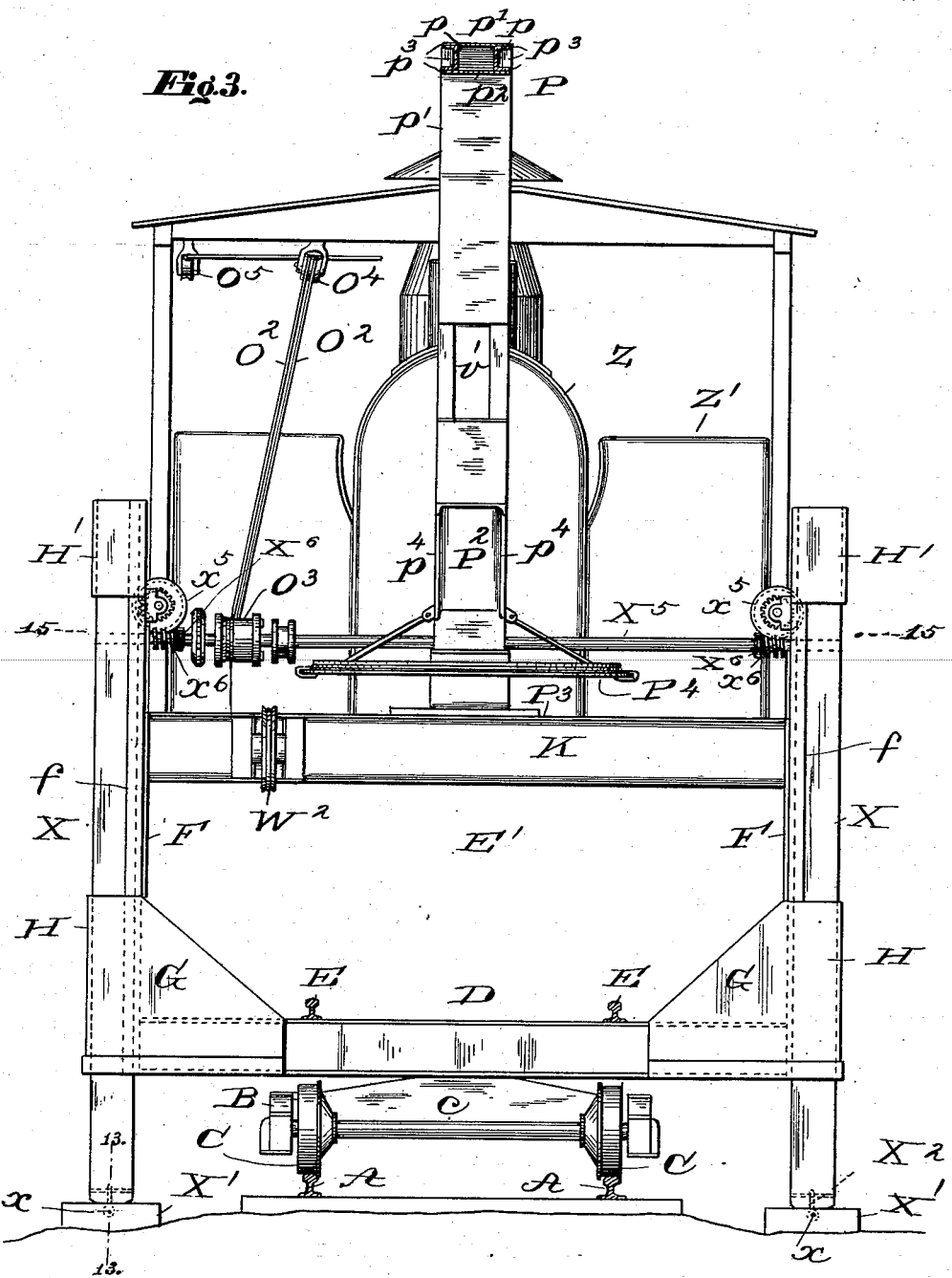

No. 654,954. Patented July 31, 1900.
G. W. DECKER.
CAR LOADING APPARATUS.
(Application filed Apr. 21, 1899.)

(No Model.) 6 Sheets—Sheet 4.

Attest:
Melville C. Hawly
G. A. Tauberschmidt

Inventor:
George W. Decker
by Benj. F. Rex
attorney

No. 654,954. Patented July 31, 1900.
G. W. DECKER.
CAR LOADING APPARATUS.
(Application filed Apr. 21, 1899.)
(No Model.) 6 Sheets—Sheet 5.
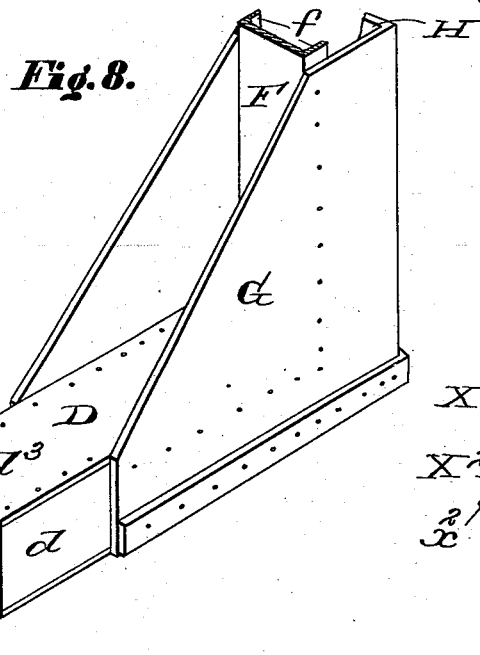
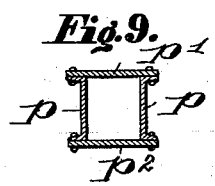
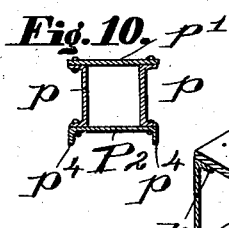
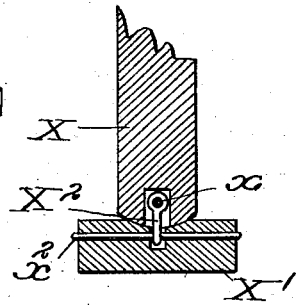
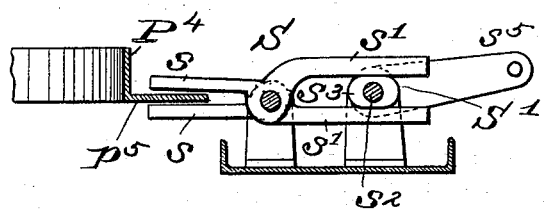
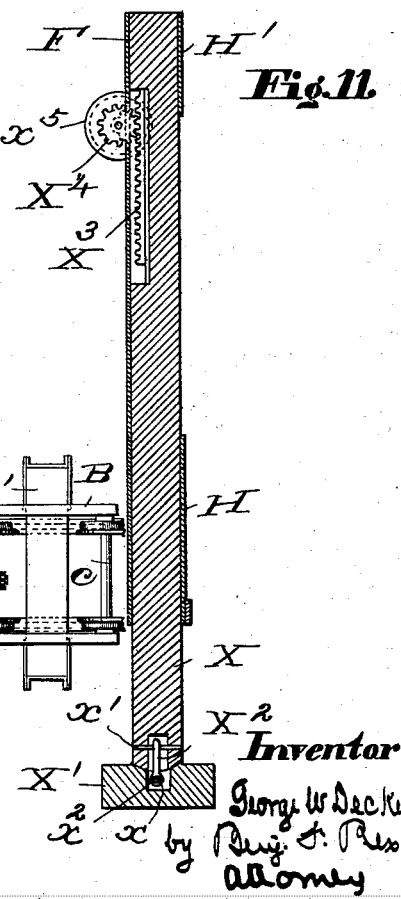
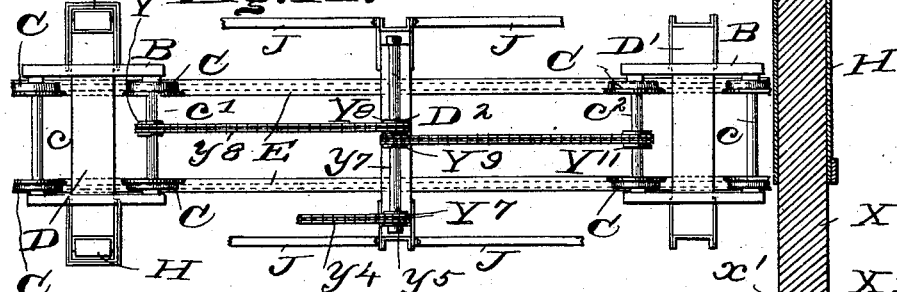
Attest:
Melville C. Hawley
G. A. Tauberschmidt
Inventor:
George W. Decker
by Benj. T. Rex
Attorney
THE NORRIS PETERS CO., PHOTO-LITHO., WASHINGTON, D. C.

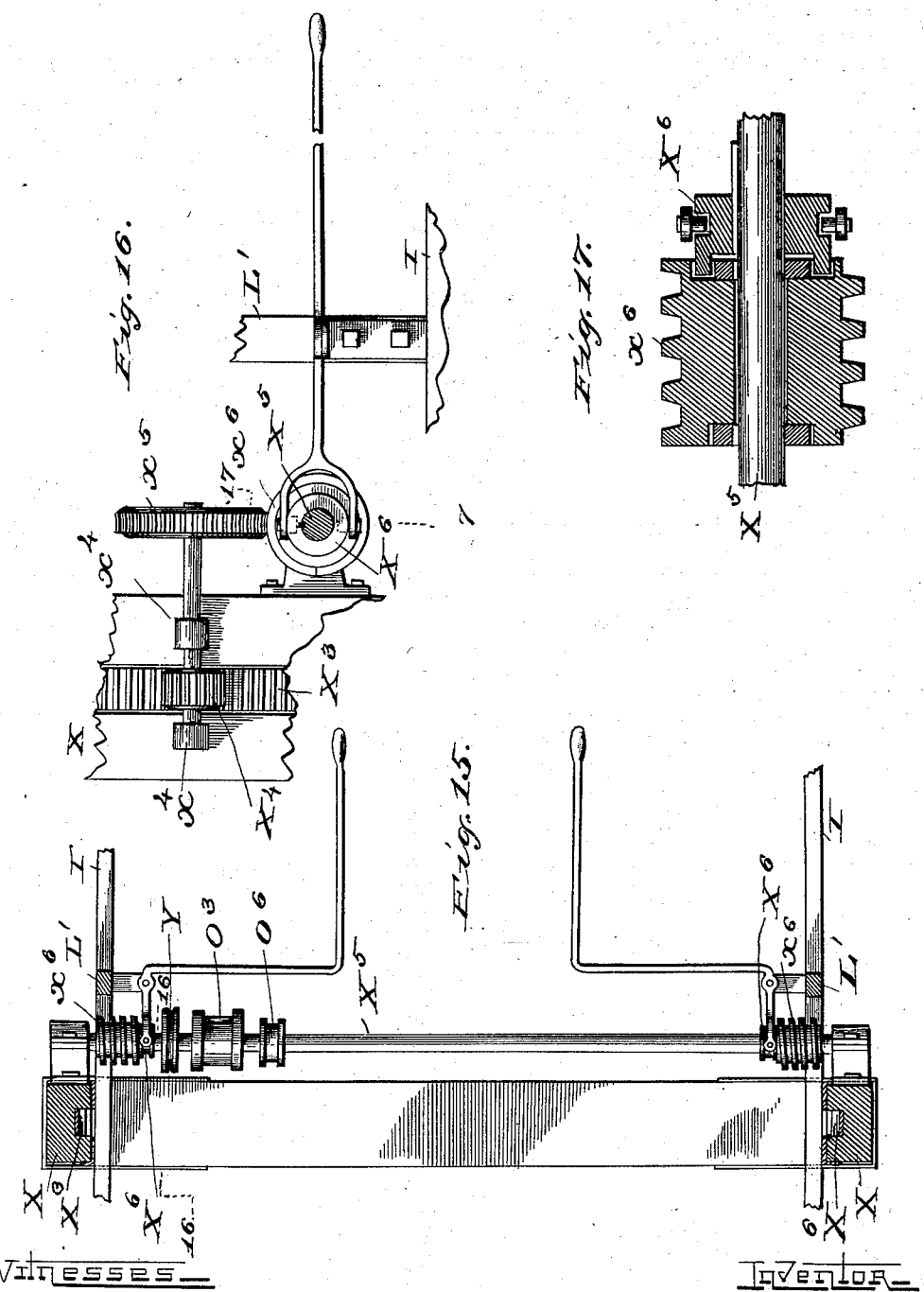

UNITED STATES PATENT OFFICE.

GEORGE WESLEY DECKER, OF NEWPORT, ARKANSAS.

CAR-LOADING APPARATUS.

SPECIFICATION forming part of Letters Patent No. 654,954, dated July 31, 1900.

Application filed April 21, 1899. Serial No. 713,835. (No model.)

*To all whom it may concern:*

Be it known that I, GEORGE WESLEY DECKER, a citizen of the United States, residing at Newport, in the county of Jackson and State of Arkansas, have invented certain new and useful Improvements in Car-Loading Apparatus, of which the following is a specification.

My invention relates to improvements in the car-loading apparatus for which Letters Patent No. 621,043 were granted to me on March 14, 1899; and the main objects of my improvements are, first, to strengthen the frame of the original apparatus; second, to provide improved means for bracing and anchoring the apparatus when in use; third, to adapt its front incline to make a more perfect connection with the rails of a track upon which the apparatus is standing, especially at curves; fourth, to provide improved means for elevating and lowering the front and rear inclines; fifth, to provide improved means for handling logs; sixth, to enable the apparatus to handle a train of cars, and, seventh, to make it self-propelling. I attain these objects and other secondary objects by mechanism whose preferred form is illustrated in the accompanying drawings, in which—

Figure 1:
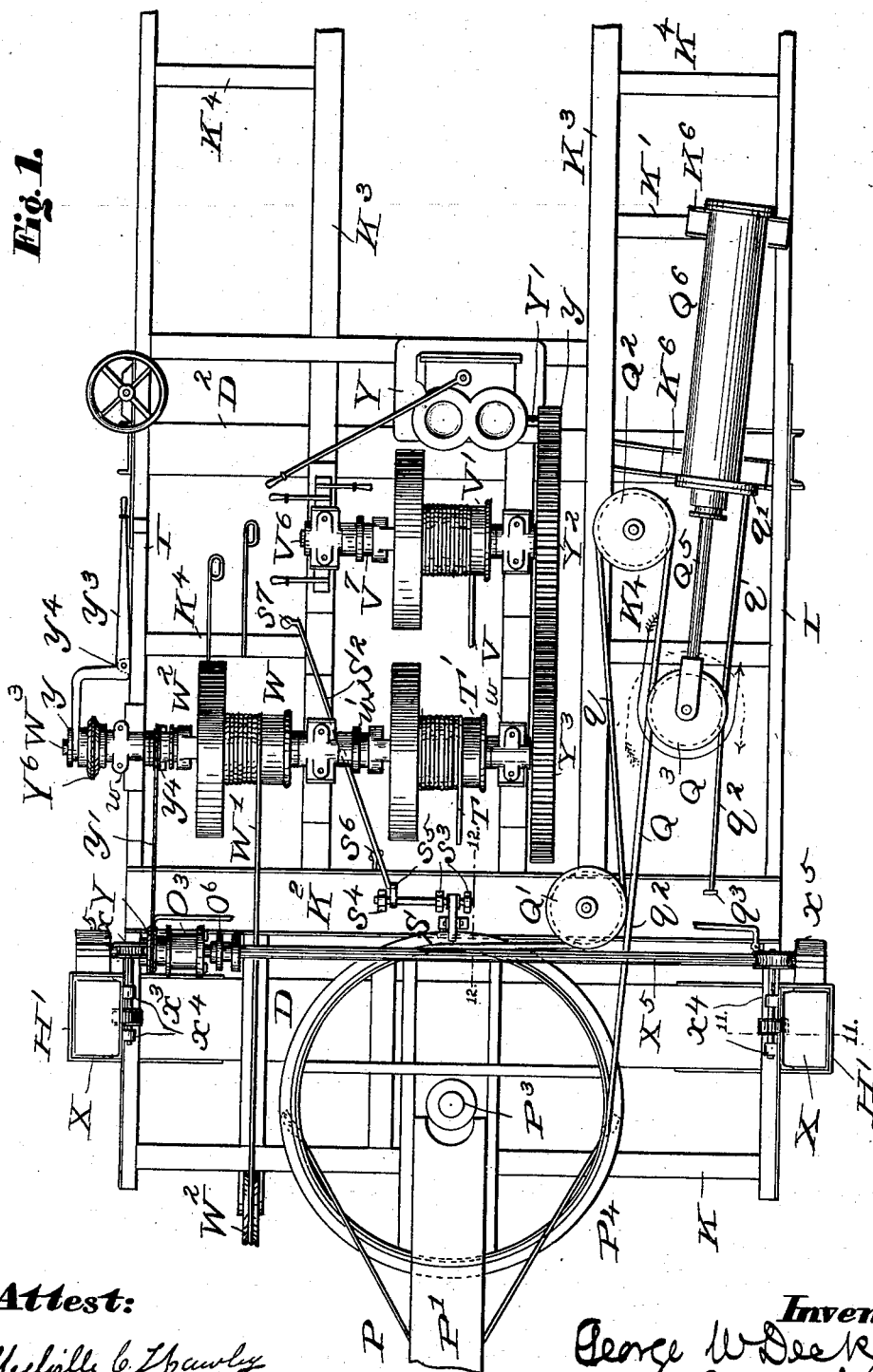
Figure 5:
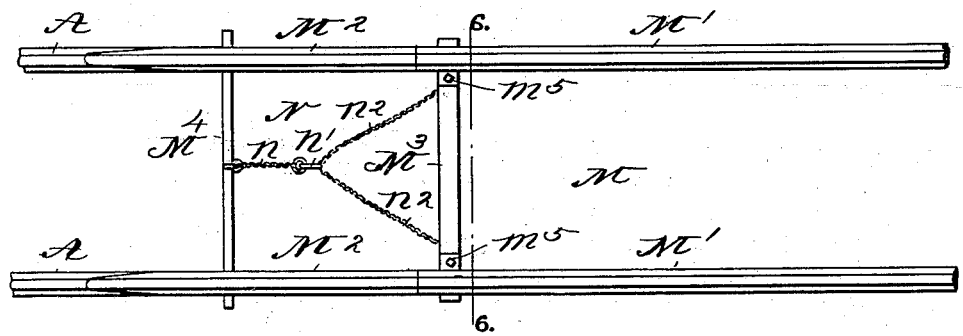
Figure 6:
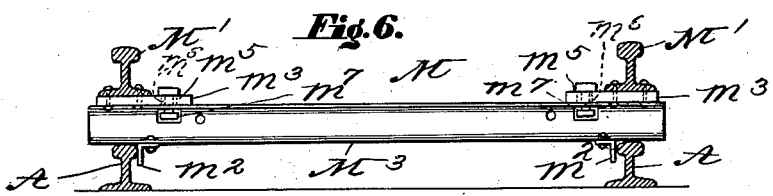
Figure 7:
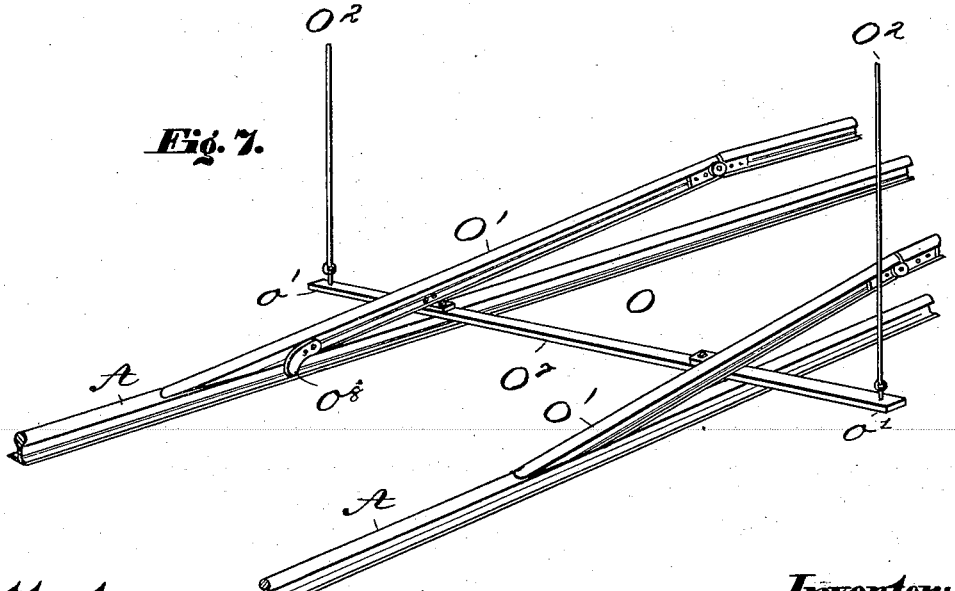

Figure 1 is a plan view of an apparatus embodying my improvements with the roof removed and parts broken away. Fig. 2 is in part a side elevation of the apparatus with the roof-supports next the observer omitted and in part a vertical longitudinal section of the roof. Fig. 3 is a front elevation of the apparatus with the front incline, hereinafter described, removed. Fig. 4 is a detailed side elevation of the portion of the rear incline shown broken away in Fig. 2. Fig. 5 is a detailed plan view, on an enlarged scale, of said front incline. Fig. 6 is a vertical cross-section on line 6 6, Fig. 5. Fig. 7 is a view in perspective of a detail. Fig. 8 is an isometric projection, on an enlarged scale, of another detail. Fig. 9 is a detailed view of a cross-section on line 9 9, Fig. 2. Fig. 10 is a similar view on line 10 10, Fig. 2. Fig. 11 is a detailed view of a vertical cross-section on line 11 11, Figs. 1 and 2. Fig. 12 is an enlarged detailed view of brake mechanism. Fig. 13 is a detailed view of a section on line 13 13, Fig. 3. Fig. 14 is an inverted plan view of the body of my apparatus. Fig. 15 is a detailed sectional plan view of the clutch and worm on line 15 15, Fig. 3. Fig. 16 is a detailed sectional view on line 16 16; Fig. 15, and Fig. 17 is an enlarged sectional view on line 17 17, Fig. 16.

Similar letters refer to similar parts throughout the several views.

A A, Figs. 2, 3, 5, 6, and 7, represent the rails of an ordinary stationary railway-track, upon which my apparatus is designed to run and on which it is adapted to stand while being used for loading cars.

B B, Figs. 2 and 3, are four-wheeled car-trucks of a common type, upon which the body of my apparatus is shown supported. The form of the trucks is immaterial, and it is not material how many wheels are used so long as the apparatus is properly supported by them and they are adapted to carry it. The wheels C of the trucks shown are designed to run upon the rails of the stationary track. They are of ordinary form, but may advantageously be made of smaller diameter than ordinary freight-car wheels, so as to enable the horizontal portion of the portable track, hereinafter described, to be carried lower than would otherwise be practicable.

D and D', Figs. 3, 8, and 14, are body-bolsters which rest upon the trucks B. The form of body-bolster shown is not essential, but has been devised for use in my apparatus and is very desirable by reason of its great strength. Its construction is shown clearly in Fig. 8 of the drawings, in which $d$ and $d'$ represent channel-beams arranged edgewise, with their flanges $d^2$ turned inward. The top of the bolster is preferably formed of a plate $d^3$, (shown riveted to the upper flanges of said beams and resting thereon,) and its bottom is preferably formed of a plate $d^4$, riveted to the under side of the lower flanges of said beams. The bolsters D are connected together in the form of my apparatus illustrated, primarily, by a pair of rails E, extending from one to the other and resting upon their respective plates $d^3$, to which they are preferably attached.

From each end of the bolster D an upright or post F preferably extends upward, which is preferably formed of a piece of channel-iron or other metal of suitable size arranged with its flanges extending outward, and is preferably attached to the adjacent end of the bolster by means of a pair of gusset-plates G, which are preferably riveted to the bolster on opposite sides thereof and to the flanges $f$ of the beam F substantially as shown in Fig. 8. These gusset-plates preferably extend outward beyond the uprights F and are preferably bent, as shown, so as to form guides H, Figs. 1, 2, 3, and 8, for the reception of spuds, which will be hereinafter described. The adjacent gusset-plates G may be formed integral, if desired, of one piece, so bent as to form the guide H and the bracing portions shown.

The bolster D' supports a pair of uprights F', preferably only differing from the uprights F in being shorter than the latter uprights. They are preferably secured to the bolster D' by gusset-plates G', Fig. 13, riveted thereto, and preferably only differing from the gusset-plates G in not extending out beyond the uprights, so as to form guides.

At a height above the rails E sufficient to permit logging-cars or such other cars as may be intended to be loaded by the apparatus to pass without obstruction beneath the cross-beams thereby supported side sills I are attached to the uprights F and F'. The side sills I are preferably secured to the uprights F and F' by means of gusset-plates I', riveted to both uprights and said sills. From the side sills I uprights $F^2$ depend, one on each side of the apparatus, whose upper ends are secured to the side sills by means of gusset-plates I' substantially as the uprights F and F' are secured to said sills. The lower ends of the uprights $F^2$ are connected by a bolster $D^2$, Figs. 1 and 14, preferably substantially like the bolsters D and D', which, preferably, extends beneath the rails E about midway between the bolsters D and D' and assists in supporting said rails. The lower ends of the uprights $F^2$ are prevented from swinging longitudinally and are assisted in supporting the bolster $D^2$ by the angle-bars J, whose upper ends are attached to the side sills I and whose lower ends are attached to the bolster $D^2$. The side sills I are shown connected by end sills K and K' and a cross-piece $K^2$ and supporting longitudinal beams $K^3$ and cross-pieces $K^4$, $K^5$, and $K^6$, intended to support a portion of the apparatus hereinafter described; but the form of this supporting-frame is immaterial. The apparatus is shown provided with a roof L, supported upon posts L', rising from the side sills I, Figs. 1 and 2, but it forms no part of my improvement.

At its front end my apparatus is preferably provided with an incline M, adapted when lowered to connect the front ends of the rails E with rails A of a stationary track upon which the apparatus is standing. The incline M is preferably hinged to the apparatus, so as to allow its outer end to be raised and lowered, and the preferred form of the front incline M is shown in Figs. 2, 5, and 6. In that form an inclinable section of track is formed of two pairs of rails M' and $M^2$, the members of each pair being spaced apart in a suitable manner and the abutting ends of the two pairs being connected together by suitable hinge-joints $m$ or equivalents adapted to allow the outer end of the section containing the rails $M^2$ to sink low enough to form an angle with the rails M' of the inner section when it is necessary in order to enable the outer ends of the rails $M^2$ to come in contact with the main track or approach them close enough for practical purposes. The inner ends of the rails M' are preferably connected to the front ends of the rails E by means of ordinary hinges $m'$, and near their lower ends they are connected by a cross-tie $M^3$, which rests upon the rails A of the main track when the incline is lowered, and is preferably provided on its under side with a pair of anchors $m^2$, projecting downward and adapted to extend down on the inner sides of opposite rails A and prevent the tie $M^3$ from moving crosswise.

In order to enable the incline to fit the main track, especially at curves, it is desirable to connect the rails M' to the cross-tie $M^3$, so as to allow them some lateral play, and this may be done by securing each rail M' to a plate $m^3$ by bolts $m^4$ or otherwise and connecting each plate $m^3$ to the cross-tie $M^3$ by means of a bolt $m^5$, passing through a slot $m^6$ in the plate and a corresponding slot $m^7$ in the tie $M^3$, from which its head will prevent its escaping, as shown most clearly in Fig. 6. The rails $M^2$ of the outer section of the incline M are shown connected together by means of a cross-tie $M^4$. When the apparatus is being moved from place to place on the main track, the inclines are lifted, and the incline M is preferably provided with a bridle attached to the cross-ties $M^3$ and $M^4$, so constructed that when lifted by means of a rope inclining inward from above the main strain will come first upon the cross-tie $M^4$ and afterward, as the outer end of the incline is elevated, will be distributed more evenly between the ties $M^3$ and $M^4$, the object being to prevent the outer end of the incline from swinging downward too freely when the lifting is begun. The preferred device for accomplishing my purpose is a bridle N, Figs. 2 and 5, preferably composed of a section of a chain or rope $n$, whose outer end is attached to the cross-tie $M^4$ near the middle thereof and whose inner end connects with a link $n'$, from which ropes or chains $n^2$, longer than the rope or chain $n$, and preferably, but not necessarily, about three times as long, extend toward opposite extremities of the tie $M^3$, to which tie they are preferably connected substantially as indicated in said Fig. 5.

The rear of the apparatus is provided with an incline O, Figs. 2, 4, and 7, preferably having a pair of rails O', arranged to form a track, and preferably having their inner ends connected with the rear ends of the rails E by means of hinge-joints $o$ of any suitable form. Their outer ends are preferably connected by means of a cross-tie O⁷, to which they are shown attached and which preferably rests upon the rails A beneath the incline when the latter is in its lowest position. Its ends O' o' preferably project beyond the sides of the incline far enough to permit ropes O² for elevating the incline O to be attached thereto far enough out to prevent cars passing over the incline from coming in contact with them. Near the outer end of each rail O', I preferably attach an anchor $o^3$, adapted to extend down on the inner side of the rail A, upon which the rail O' rests when in its lowest position; but any other suitable means for securing the same result may be substituted therefor.

The mechanism for doing the work of loading is preferably carried above the track framed by the rails E upon the superstructure supported by the uprights F and F'.

P, Figs. 1, 2, 3, 9, and 10, represents a derrick whose boom P' p is preferably composed of a pair of channel-beams, arranged edgewise with a space between them and with their webs inward and connected together by means of top plates p' and bottom plates $p^2$ and a heel-plate P², preferably secured to their respective flanges $p^3$, Fig. 3. The heel-plate P² is preferably formed of a channel-piece arranged with its flanges $p^4$ extending downward substantially as shown in Figs. 3, 4, and 10. It is intended to catch the heel of a log or beam when the latter after being caught between the inner end and its center of gravity is lifted while parallel with the boom P' until its heel strikes the plate P² between its flanges. Afterward it may be swung around and laid in the proper position on a car. A suitable position for the log or beam while being swung is shown in Fig. 2.

The lower end of the boom P' is pivotally supported at P³, Fig. 1, in the usual manner and carries a swinging circle P⁴, provided with an annular flange $p^5$. The boom is preferably turned by means of a rope Q, Figs. 1 and 2. One end q of this rope preferably extends first over a sheave Q', then back over a sheave Q², then forward and over a double sheave Q³, and thence back to a point q', where it is made fast. The other end $q^2$ of the rope Q passes back and around the sheave Q³, and thence forward again to a point $q^3$, where it is made fast. The sheave Q³ is pivoted in a fork Q⁴, attached to the piston-rod Q⁵ of a reciprocating engine Q⁶ of common form.

The swinging motion of the boom P' can be stopped at any desired point by applying a brake to the flange $p^5$ of the swinging circle P⁴. The brake S, Figs. 1, 2, and 12, is the form of brake preferred and preferably consists of a pair of tongs whose jaws s are arranged one above and the other below the flange $p^5$, as shown most clearly in Fig. 12. Between the lever-arms s' an eccentric S' is arranged, whose shaft $s^2$ turns in bearings $s^3$ and $s^4$, and is provided with a fixed lever $s^5$, to which a lever S², fulcrumed at $s^6$, is pivotally attached, so that when the outer end $s^7$ of said lever is depressed the eccentric S' will be caused to turn a fraction of a revolution and force the arms s' of said brake apart, and thus cause its jaws to grip the flange $p^5$.

The outer end of the boom P' is preferably supported and elevated and lowered by means of a rope T, shown passing from a winding-drum T' over a sheave T², hanging from an A-frame U, thence over a sheave T³, secured to the boom P' by means of an arm T⁴, with which said sheave is pivotally connected. It then passes back over a sheave T⁵, pivotally connected to an arm u, whose inner end is pivotally connected at u' to the frame U, and then passes back to the arm T⁴, to whose outer end it is attached; but though the arrangement described is considered the best other means of elevating and lowering the boom may be substituted for those shown, as will be obvious.

The logs, beams, and other articles handled by the apparatus may be raised and lowered by any suitable arrangement of tackle. The one shown is, however, considered the best. In it a rope V, Figs. 1 and 2, whose inner end is attached to the winding-drum V', passes forward beneath a sheave v, then up through the swinging circle and over a sheave V², supported by the boom P', and only shown in Fig. 2, then through an opening v' through said boom, then over the sheave $v^2$ of a tackle V³, suspended from the outer end of the boom P, thence through the running-block V⁴ and under its sheave $v^3$, thence up to the boom P', to which it is attached at $v^4$. From the block V⁴ a rope $v^5$ or other suitable means for attaching the article to be lifted to said block extends downward. When the apparatus is to be moved, the rope is attached to the ring n' of the bridle N of the front incline M, and the latter's outer end is elevated by causing the drum V' to rotate. It is shown in an elevated position in dotted lines in Fig. 2.

W represents a winding-drum from which a rope W', Figs. 1, 2, and 4, is represented as first passing forward over a sheave W², shown supported by the front sill K, and thence back under said sheave and through the space E' between the rails E and the cross-beams above them, and in Fig. 4 its rear end is shown attached to a logging-car W² at w. By winding this rope upon its drum W any car back of the apparatus, to which the rope is attached and which is not too large to pass through the space E' above the rails E, can be drawn forward up over the rear incline O, thence through the apparatus on the rails E, and forward onto the incline M in position to be loaded by means of the derrick P.

O³ represents a winding-drum from which the ropes O² pass to a double sheave O⁴, from which they extend back over sheaves O⁵ and thence down to the cross-tie O⁷ of the rear incline O. By means of said drum $O^3$ the incline O can be lifted when desired. It is shown in an elevated position in dotted lines in Fig. 2.

In order to give my apparatus increased stability and also to enable it to be readily anchored in position, so as to prevent its moving longitudinally when the means for drawing cars forward into position for loading, hereinbefore described, are used, I preferably provide my loader with a pair of spuds X, Figs. 1, 2, 11, and 13, which move vertically in guides H and H', secured to the uprights F and preferably formed in part by said uprights and their outwardly-extending flanges $f$. Each of said spuds is preferably provided with a shoe X', with which it is preferably connected by means of a bolt $X^2$, having an eye $x$ at each end arranged at right angles to each other. Through the upper eye a bolt $x'$ passes and secures the bolt $X^2$ to the spud X, and through the opposite eye $x$ a bolt $x^2$ passes and connects the bolt $X^2$ to the shoe X'. The shoe X' is thus made inclinable, so as to enable it to find a firm bearing on unlevel ground, and to prevent its sinking far in soft ground I prefer to make it larger in horizontal cross-section than the spud X. The spuds X are preferably adapted to be raised and lowered separately, so as to enable them to be properly adjusted as circumstances may require. The means which I prefer to use for elevating them is illustrated in the drawings, in which $X^3$, Figs. 1, 2, 3, 11, and 16, represents a rack, and $X^4$ a toothed pinion which preferably extends through a suitable slot in the upright F, by which the spud is supported. The pinion is preferably secured to a shaft $x^3$, turning in bearings $x^4$ and having attached to its rear end a worm-gear $x^5$, which meshes in with a worm $x^6$, running loosely upon a shaft $X^5$, except when made fast thereto by a clutch $X^6$, which may be of any common form. The shaft $X^5$ carries both of said worms $x^6$ and preferably also the winding-drum $O^3$, hereinbefore mentioned, which preferably runs loose therein, except when made fast by means of a clutch $O^6$, which may be of any suitable form.

The winding-drums T and W are preferably arranged loose on a shaft $W^4$, turning in bearings $w$. The drum T is preferably made fast to said shaft by a clutch $w'$ when desired, and the drum W may be made fast by a clutch $w^2$, both of which may be of common form. The drum V' is preferably loose on its shaft $V^6$ and may be secured thereto by a suitable clutch $V^7$ of common form.

Y represents a steam-engine of common form having a driving-shaft Y', provided with a pinion $y$, which meshes in with a gear $Y^2$, attached to the shaft $V^6$, which in turn meshes in with the gear $Y^3$, attached to the shaft $W^3$. The shaft $W^3$ preferably also has attached thereto a sprocket-wheel $Y^4$, from which a chain $y'$ is shown extending to a sprocket-wheel $Y^5$, attached to the shaft $X^5$.

The apparatus may be propelled by power derived from the engine Y by suitable mechanism, of which a desirable form is shown. In that form a loose sprocket-wheel $Y^6$, Fig. 1, is carried by the shaft $W^3$, which may be made fast by means of a clutch $y^2$, having a lever $y^3$ fulcrumed at $y^4$. From the wheel $Y^6$ a sprocket-chain $y^4$, Figs. 2 and 5, extends to a sprocket-wheel $Y^7$, attached to a shaft $y^7$, supported in bearings $y^5$. The shaft $y^7$ also carries sprocket-wheels $Y^8$ and $Y^9$, and from the former a sprocket-chain $y^8$ extends to a wheel $y^{10}$, attached to the shaft $c'$ of the wheels C, and from the wheel $Y^9$ a similar chain runs to the sprocket-wheel $Y^{11}$ of the shaft $c^2$, connecting a pair of the wheels C of the rear truck.

By making my apparatus self-propelling it is enabled to draw a train of empty cars to the place where they are to be loaded, and then by means of the hereinbefore-described apparatus, by means of which it is enabled to draw cars through, it can, after its inclines are lowered, first draw the train through it from front to rear until the front car is beneath the derrick P in position to be loaded, and after loading said car the train can be drawn forward until the second car is in position, and so on until the entire train is loaded and ready to be taken to the sawmill by a locomotive. Where a train of empty cars are brought to the apparatus by a locomotive, the train is preferably backed through the apparatus over the incline M, the rails E, and incline O until the front car is in position to be loaded, and thereafter either can be left to the loader or drawn forward by the locomotive a car length at a time until all are loaded. In Figs. 2 and 3 a boiler $z$ and water-tank Z' are shown, but form no part of my invention.

I claim—

1. In a car-loading apparatus, the combination with a car adapted to run on a main railway-track, of a section of track running over or through said car, a second section of track for forming an inclination between said first section and the main track, a cross-tie carried by said second section and adapted to rest on the main track, and means connecting said second section of track with said cross-tie so as to allow lateral play.

2. In a car-loading apparatus, the combination with a car adapted to run on a main railway-track, of a section of track running over or through said car, a second section of track for forming an incline between said first section and the main track, a cross-tie provided with means for preventing it moving laterally on the main track, and connections between said cross-tie and second section of track, said connections allowing play between the said parts.

3. In a car-loading apparatus, the combination with a car adapted to run on a main track, of an incline for connecting said car with the main track, said incline consisting of two sections of track hinged together, a cross-tie for each of said sections, and a bridle connected with said ties for elevating said incline.

4. The combination in a car-loading apparatus of a car carrying a section of railway-track; and inclines for connecting said section of track with a main track, one of said inclines containing two sections of railway-track hinged to each other, and said incline being provided with a support between its ends.

5. The combination in a car-loading apparatus of a car carrying a section of railway-track and an incline for connecting said section of track with a main track, said incline containing two sections of track hinged together and the rails of each section being connected together by a cross-piece adapted to rest upon the rails of a main track and support the incline when in its lowest position.

6. The combination in a car-loading apparatus of a car, a section of a railway-track, carried by the car; and an incline for connecting said section of track with a main track, and containing four sections of rails, two on each side, connected by hinged joints, cross-pieces connecting each pair of rails near their respective outer ends, and a bridle for lifting the outer end of the incline which brings the strain first upon the outer section thereof and subsequently divides it between the outer and inner section.

7. In a loading apparatus, the incline M having the sections M' and M² connected by hinged joints; the cross-pieces M³, the bridle N having the parts $n$ and $n^2$ and the ring $n'$.

8. The combination of a derrick having a flanged swinging circle; a pair of clamping-jaws for gripping said flange and acting as a brake; and means for operating said jaws.

9. The combination of a derrick having a flanged swinging circle; a pair of clamping-jaws for gripping said flange and acting as a brake, a reciprocating engine for swinging the derrick; and means for transmitting motion from the engine to the derrick.

10. The combination of a spud; a rack carried by the spud; a pinion engaging the rack; a shaft; a loose worm-gear on said shaft; a clutch for said gear; a pinion engaging said worm and means connecting the first and last named pinions substantially as described.

11. In a car-loading apparatus, the combination with a pair of trucks provided with bolsters, of uprights carried by said trucks, side sills carried by said uprights, a bolster suspended from said side sills between said first-named bolsters, and a track supported by said bolsters.

12. In a car-loading apparatus, the combination with a pair of trucks provided with bolsters, of uprights carried by said trucks, side sills carried by said uprights, a bolster suspended from said side sills between said first-mentioned bolsters, a section of track supported by said bolsters, and a second section of track pivotally mounted on said first-named section.

13. In a car-loading apparatus, the combination with a pair of trucks, of a track supported by said trucks, uprights carried by one of said trucks, guides carried by said uprights, a pair of spuds in said guides, and means for raising and lowering said spuds.

14. In a car-loading apparatus, the combination with a car adapted to run on a main railway-track, of a section of track carried by said car, a second section of track pivoted to said first section and provided with a support, and a third section of track pivoted to said second section and adapted to rest on the main track.

15. In a car-loading apparatus, the combination with a pair of trucks, of bolsters carried by said trucks, gusset-plates connecting one of said bolsters to uprights, said gusset-plates forming guides, spuds sliding in said guides, and means for raising and lowering said spuds.

16. In a car-loading apparatus, the combination with a car adapted to run on a railway-track, of a pair of spuds carried by said car and provided with racks, pinions meshing with said racks, worm-gearing for driving said pinions, and a shaft for driving said worm-gearing.

17. In a car-loading apparatus, the combination with a car adapted to run on a railway-track, of a pair of spuds carried by said car and provided with racks, pinions meshing with said racks, a worm-wheel for each of said pinions, a shaft provided with two worms meshing with said worm-wheels, and means for independently throwing said worms into operation.

GEORGE WESLEY DECKER.

In presence of—
GEORGE GOODRICH,
FRANK SUMNER HESS.